(12) United States Patent
Tanase et al.

(10) Patent No.: US 11,651,151 B2
(45) Date of Patent: May 16, 2023

(54) AUTOMATED MULTI-SOURCE WEBSITE HYBRIDIZATION USING STREAMING DATA

(71) Applicants: Chaz Tanase, Ansonia, CT (US);
Gerald Christophe, Le Moule (FR);
Sean Burke, Arlington, VA (US)

(72) Inventors: Chaz Tanase, Ansonia, CT (US);
Gerald Christophe, Le Moule (FR);
Sean Burke, Arlington, VA (US)

(73) Assignees: Chaz Tanase, Ansonia, CT (US);
Gerald Christophe, Ansonia, CT (US);
Sean Burke, Ansonia, CT (US)

( * ) Notice: Subject to any disclaimer, the term of this patent is extended or adjusted under 35 U.S.C. 154(b) by 15 days.

(21) Appl. No.: 16/695,788

(22) Filed: Nov. 26, 2019

(65) Prior Publication Data

US 2020/0175225 A1 Jun. 4, 2020

Related U.S. Application Data

(60) Provisional application No. 62/774,432, filed on Dec. 3, 2018.

(51) Int. Cl.
*G06F 40/197* (2020.01)
*G06F 40/151* (2020.01)
(Continued)

(52) U.S. Cl.
CPC .......... *G06F 40/197* (2020.01); *G06F 40/134* (2020.01); *G06F 40/151* (2020.01); *H04L 67/52* (2022.05)

(58) Field of Classification Search
CPC .... G06F 16/972; G06F 40/134; G06F 40/151; G06F 40/197; H04L 67/02; H04L 67/18
See application file for complete search history.

(56) References Cited

U.S. PATENT DOCUMENTS 7,769,633 B2 8/2010 Jokinen et al.
7,870,022 B2 1/2011 Bous et al.
(Continued)

OTHER PUBLICATIONS

"Mobile Recommender Systems in Tourism"; Gavalas et al.; Journal of Network and Computer Applications; http://www.syros.aegean.gr/users/dgavalas/en/iframe_files/papers/2013/JNCA_accepted_man; Apr. 22, 2013.

*Primary Examiner* — Stephen S Hong
*Assistant Examiner* — Nicholas Hasty
(74) *Attorney, Agent, or Firm* — Caldwell Intellectual Property Law, LLC (57) ABSTRACT

A method of automated multi-source website hybridization using streaming data, and performed by first server, includes extracting, from a communication received from a remote device, an identifier of the remote device and at least a portion of a website including a first display generation element, a second display generation element and at least a reference link identifying the first server, each configuring a remote device to provide to a user a user-navigable display combining a visual element and a user-selectable navigation link, generating a first location descriptor, retrieving at least a data stream using the first location descriptor, and remotely generating a hybrid website on the remote device by creating at least a modified second display generation element configuring the remote device to display a second user-navigable display combining the a first user-navigable display with a data stream received from the first server, combined with the first display generation element.

18 Claims, 4 Drawing Sheets

(51) Int. Cl.
*G06F 40/134* (2020.01)
*H04L 67/52* (2022.01)

(56) References Cited

U.S. PATENT DOCUMENTS

| | | | |
|---|---|---|---|
| 8,229,458 | B2 | 7/2012 | Busch |
| 8,831,642 | B2 | 9/2014 | Moldavsky et al. |
| 9,152,726 | B2 | 10/2015 | Lymperopoulos et al. |
| 9,817,916 | B2 * | 11/2017 | Flack ................ G06F 16/986 |
| 10,044,728 | B1 * | 8/2018 | Tripathi ................ H04L 67/02 |
| 10,433,021 | B2 * | 10/2019 | Christoph .......... H04N 21/2143 |
| 2003/0220835 | A1 * | 11/2003 | Barnes, Jr. ............ G06Q 10/02 |
| | | | 379/93.12 |
| 2006/0178932 | A1 | 8/2006 | Lang |
| 2008/0172274 | A1 * | 7/2008 | Hurowitz ............. H04L 67/26 |
| | | | 455/433 |
| 2012/0190386 | A1 | 7/2012 | Anderson |
| 2012/0203873 | A1 * | 8/2012 | Lewin ............... G06F 16/9574 |
| | | | 709/219 |
| 2012/0239504 | A1 | 9/2012 | Curlander et al. |
| 2013/0013595 | A1 | 1/2013 | Tseng et al. |
| 2013/0073389 | A1 | 3/2013 | Heath |
| 2013/0085861 | A1 | 4/2013 | Dunlap |
| 2013/0197992 | A1 | 8/2013 | Bao |
| 2014/0257991 | A1 | 9/2014 | Christensen et al. |
| 2014/0281918 | A1 * | 9/2014 | Wei .................... H04L 67/02 |
| | | | 715/234 |
| 2014/0330645 | A1 | 11/2014 | Craft |
| 2015/0019944 | A1 * | 1/2015 | Kalgi ................ G06Q 20/3552 |
| | | | 715/205 |
| 2015/0058324 | A1 | 2/2015 | Kauwe |
| 2016/0171005 | A1 | 6/2016 | Xin |
| 2016/0337426 | A1 * | 11/2016 | Shribman ............. H04L 65/608 |
| 2017/0310722 | A1 * | 10/2017 | Chen .................... H04L 65/605 |
| 2019/0057161 | A1 * | 2/2019 | Ackerman .......... G06F 16/9535 |

* cited by examiner

┌─────────────────────────────────────────────┐
│ Extracting, from a Communication Received from a First │
│ Remote Device, an Identifier of the First Remote Device │
│ and at Least a Portion of a Website │
│ 305 │
└─────────────────────────────────────────────┘
                      ↓
┌─────────────────────────────────────────────┐
│ Generating at Least a First Location Descriptor using the │
│ at Least a Portion of the Website │
│ 310 │
└─────────────────────────────────────────────┘
                      ↓
┌─────────────────────────────────────────────┐
│ Retrieving at Least a Data Stream Using the at Least a │
│ First Location Descriptor │
│ 315 │
└─────────────────────────────────────────────┘
                      ↓
┌─────────────────────────────────────────────┐
│ Remotely Generating a Hybrid Website │
│ 320 │
└─────────────────────────────────────────────┘

AUTOMATED MULTI-SOURCE WEBSITE HYBRIDIZATION USING STREAMING DATA

CROSS-REFERENCE TO RELATED APPLICATIONS

This application claims the benefit of priority of U.S. Provisional Patent Application Ser. No. 62/774,432 filed on Dec. 3, 2018, and titled "AUTOMATED MULTI-SOURCE WEBSITE HYBRIDIZATION USING STREAMING DATA," which is incorporated by reference herein in its entirety.

FIELD OF THE INVENTION

The present invention generally relates to the field of data streaming. In particular, the present invention is directed to automated multi-source website hybridization using streaming data.

BACKGROUND

The Word Wide Web is an unprecedentedly effective resource for dissemination and collection of information. Unfortunately, the Web as currently constituted suffers from many frustrating inefficiencies. Information of interest to many people is often ephemeral and constantly changing and locked in the heads of persons who are too busy, often by virtue of their very relevance to other users, to engage in the unwieldy process of updating their websites. Platforms that are more readily modified are siloed at their points of operation, requiring users engaging with them to relinquish control over their information and to maintain separate locations for local websites and up-to-date content. This problem is compounded by the fact that a user might navigate to a website, such as a local municipal directory, at which the number of potential sources of information is so colossal as to be overwhelming; it is effectively impossible to update such a site, as presently constituted, at anything close to an acceptable rate, and a user interested in local information must instead navigate to various separate websites, at the mercy of search-engine optimization and advertising tricks. The result is a technology designed to connect users with data, and unable to do so adequately because of its inherent inefficiency.

SUMMARY OF THE DISCLOSURE

In an aspect, a method of automated multi-source website hybridization using streaming data, the method includes extracting, by a first server connected to a network, from a communication received from a first remote device, an identifier of the first remote device and at least a portion of a website, the website located at a second server connected to the network, wherein the website further includes at least a first display generation element and at least a second display generation element, each of the at least a first display generation element and the at least a second display generation element configuring the first remote device to provide to a user at least a first user-navigable display received from the second server, the at least a first user-navigable display combining at least a visual element and at least a user-selectable navigation link and at least a reference link incorporated in the at least a second display generation element the at least a reference link identifying a display location at the at least a second display generation element. The method includes generating, by the first server, at least a first location descriptor using the at least a portion of the website. The method includes retrieving, by the first server, at least a data stream using the at least a first location descriptor. The method includes remotely generating, by the first server, a hybrid website on the client device, the hybrid website combining the at least a first display generation element with at least a modified second display generation element wherein generating the hybrid website includes creating the at least a modified second display generation element, the at least a modified second display generation element configuring the first remote device to display a second user-navigable display combining the at least a first user-navigable display with the at least a data stream at the at least a reference link.

In another aspect, a system for automated multi-source website hybridization using streaming data includes a first server connected to a first remote device over a network, the first server designed and configured to extract, from a communication received from a first remote device, an identifier of the first remote device and at least a portion of a website, the web site located at a second server connected to the network, wherein the website further includes at least a first display generation element and at least a second display generation element, each of the at least a first display generation element and the at least a second display generation element configuring the first remote device to provide to a user at least a first user-navigable display received from the second server, the at least a first user-navigable display combining at least a visual element and at least a user-selectable navigation link and at least a reference link incorporated in the at least a second display generation element the at least a reference link identifying a display location at the at least a second display generation element generate at least a first location descriptor using the at least a portion of the website retrieve at least a data stream using the at least a first location descriptor and remotely generate a hybrid website on the client device, the hybrid website combining the at least a first display generation element with at least a modified second display generation element wherein generating the hybrid website includes creating the at least a modified second display generation element, the at least a modified second display generation element configuring the first remote device to display a second user-navigable display combining the at least a first user-navigable display with the at least a data stream at the at least a reference link These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an embodiment, disclosed systems and methods bridge the gap between readily updated data provision resources and local websites by remotely generating a hybrid website combining streaming data with local website content. The streaming data may be derived from many sources; multiple streams may be generated on multiple queue instances, with selection of data for streams and selection of streams for generation of a hybrid website being driven both by temporary and permanent characteristics or originating devices.

Figure 1:
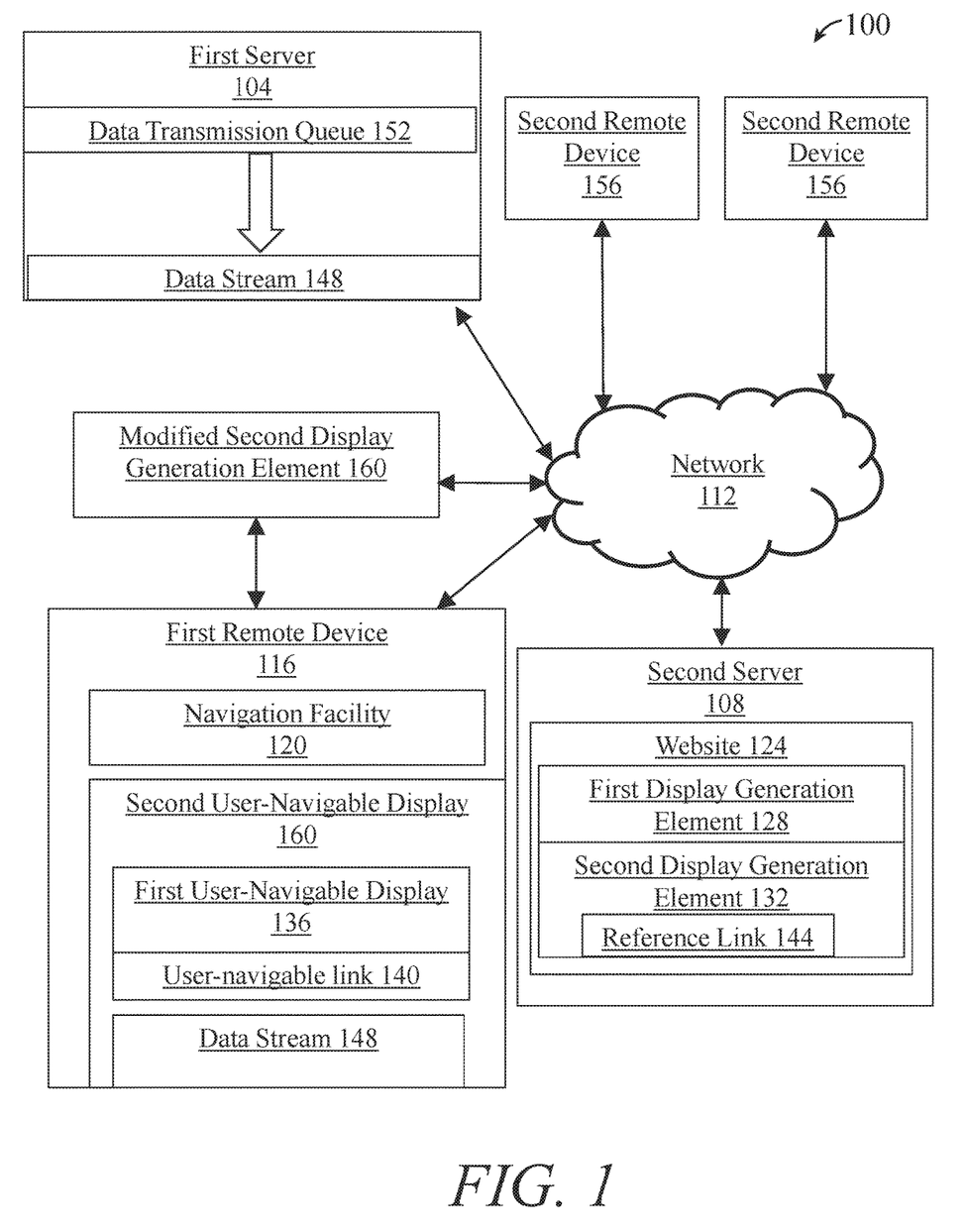
FIG. 1 is a block diagram illustrating an exemplary embodiment of a system for automated multi-source website hybridization.

Referring now to FIG. 1, a system 100 for automated multi-source website 124 hybridization using streaming data. System 100 includes a first server 104. First server 104 may include any computing device as described below in reference to FIG. 4. First server 104 may include a single computing device operating independently, or may include two or more computing devices operating in concert, in parallel, sequentially or the like. First server 104 may include one or more computing devices implementing a "cloud" infrastructure, where data storage and processing tasks may be shared among various server devices according to dictates of load balancing, speed, computing efficiency, security, and/or efficient and robust data storage. Persons skilled in the art, upon reviewing the entirety of this disclosure, will be aware of various ways in which first server 104 may be implemented consistently with the description herein.

Still referring to FIG. 1, first server 104 may communicate with a second server 108. Second server 108 may be any computing device or combination of computing devices suitable for use as first server 104 as described above in reference to FIG. 1. First server 104 may communicate with second server 108 according to any process or protocol for electronic communication between devices, including wireless and/or wired communication protocols. First server 104 may be connected to second server 108 over a network 112, which may include multiple computing devices in communication with one another using electronic means of communication; network 112 may include, without limitation, the Internet, a subset of the Internet, an intranet or local network 112, or the like. First server 104 may be connected to second server 108 over network 112 where first server 104 and second server 108 are able to transmit messages to one another, and receive messages from one another, as described in further detail below, whether directly or via one or more intervening devices or components.

With continued reference to FIG. 1, second server 108 may communicate with a first remote device 116. In an embodiment, second server 108 may communicate with multiple remote devices. Any remote device, as used herein, may be any computing device as described below in reference to FIG. 4; first remote device 116, and/or any remote device described herein, may include without limitation a personal computer, a tablet, a mobile phone such as a "smart phone" or similar device, and/or a portable computing device. First remote device 116 may include a navigation facility 120. Navigation facility 120 may be a component, set of components, or system that enables first remote device 116 to detect a location of first remote device 116 relative to a map, geographic location, or location within an area; navigation facility 120 may include without limitation a global positioning system (GPS) device, a device that detects position based on cell tower triangulation, and/or one or more components that detect direction or degree of motion, such as accelerometers, gyroscopes, an inertial measurement unit (IMU), or similar devices. First remote device 116 may include a camera, which may take still pictures, videos, or both; first remote device 116 may include an audio input device such as a microphone. First remote device 116 may receive and/or display website and/or streaming content, for instance as described in further detail below, using a web browser, native app, or other suitable program or module.

In an embodiment, and still viewing FIG. 1, second server 108 may include a website 124. Website 124 may include one or more programs or configurations that configure remote devices, such as without limitation first remote device 116, to display elements of data, including textual data, image date, and/or audio or video streaming data transmitted to remote devices. Website 124 may include at least a first display generation element 128 and at least a second display generation element 128; each of at least a first display generation element 128 and at least a second display generation element 128 may configure first remote device 116, and/or any other remote device, to provide to a user at least a first user-navigable display 136 received from the second server 108; first user-navigable display, as used herein, is a display that combines at least a visual element such as textual, image, and/or streaming data, with at least user-selectable navigation link. A user-selectable navigation link, as used herein, is a visual element a user may select using a selection tool such as a computer mouse, touch-screen, or the like, causing a different user-navigable display to display to a user; for instance, at least a first user-navigable display 136 may include a first user-navigable display having a user-selectable navigation link, selection of which may cause remote device to display a second user navigable display 164 included in at least a first user-navigable display 136. A user-selectable navigation link may include a hypertext link a user may select to cause remote device to display visual elements located at a different location within a directory or file, or as indicated by a uniform resource locator (URL), or the selection of which launches a server-side or client-side program to display new visual elements; user-selectable navigation link may alternatively or additionally include a button, or any visual element having an associated event handler, such as without limitation "click" or "touch" event handlers. In an embodiment, at least a first display generation element 128 may configure first remote device 116 to display a first user-navigable display of at least a first user-navigable display 136 and at least a second display generation element 128 may configure second remote device to display a second user navigable display 164 of at least a first user-navigable display 136.

With continued reference to FIG. 1, and for the purposes of illustration only, non-limiting examples of at least a first display generation element 128 and/or at least a second display generation element 128 may include a hypertext markup language (HTML) file, a server-side program file such as a Java Server Page (JSP), or PHP page, and/or one or more client-side programs and/or objects such as JavaScript programs, Java applets, and/or JavaScript Object Notation elements; elements of at least a first display generation element 128 and/or at least a second display generation element 128 may be combined in a single file such as a PHP, JSP, or HTML file, or may be combined by second server 108 for transmission from multiple sources, for instance as described in further detail below. At least a first display generation element 128 and/or at least a second display generation element 128 may include instructions to instantiate one or more sections or portions of first user-navigable display, including without limitation one or more frames, tables, or other subsections of displayed information. Transmission may be performed by any suitable protocol for communication across a network 112, including without limitation transmission control protocol/internet protocol (TCP/IP), hypertext transfer protocol (HTTP) or the like.

Still referring to FIG. 1, website 124 may include at least a reference link 144 identifying first sever included in at least a second display generation element 128. At least a reference link 144 may include any element of data first server 104, second server 108 and/or first remote device 116 may recognize as identifying first server 104, for instance by matching at least a reference link 144 to one or more elements of data stored at first server 104 as described in further detail below, including without limitation any user-navigable link 140 as described above and/or any textual or image data. At least a reference link 144 may be visible to a user of first remote device 116 or may be invisible to a user of first remote device 116; that is, at least a second display generation element 128 may configure remote device to conceal at least a reference link 144 from user.

With continued reference to FIG. 1, and as a non-limiting example, website 124 may cause first remote device 116 to display information describing a local directory, such as a town, city, or neighborhood directory; the local directory may describe, without limitation, governmental offices and persons, civic information concerning a local municipality, information concerning schedules and events, local resources, businesses, and/or attractions, contact information of persons working within local government or at local resources, business, and/or attractions, or the like. Such local directories frequently contain information that is out of date, owing to constantly changing local landscape and calendars of events; for instance, businesses may move or go out of business, events may be changed or canceled due to inclement weather, and the like. Furthermore, people or entities may engage in sudden or impulsive plans or events such as last-minute sale promotions at businesses, flash mobs, or similar activity; owing to barriers to rapid updating of websites as noted above, it may be difficult or impossible for administrators of website 124 to provide information in a manner that is up-to-date and relevant. This difficulty may be compounded considering that different users may be seeking radically different information at the same directory.

Continuing to refer to FIG. 1, first server 104 may be designed and configured to generate at least a data stream 148. As used herein, at least a data stream 148 is a facility that periodically or continuously transmits data to remote devices, such as without limitation first remote device 116; data may be transmitted in a quantized form such as network 112 packet form or the like. Each quantum of data may be transmitted using any suitable protocol for transmission over a network 112 as described above. In an embodiment, first server 104 may include at least a data transmission queue 152; quantized data may be loaded to at least a data transmission queue 152 and transmitted from the at least a data transmission queue 152 to one or more remote devices.

First server 104 may generate quantized data for entry on at least a data transmission queue 152 from one or more elements of data received from at least a second remote device 156. At least a second remote device 156 may include any device suitable for use as first remote device 116; at least a second remote device 156 may include a plurality of remote devices. In an embodiment, first remote device 116 may be distinct from at least a second remote device 156; first remote device 116 may be a remote device of at least a second remote device 156. At least a second remote device 156 may gather and transmit data to first server 104 as described in further detail below. As described in further detail below, data stream may transmit data that causes a receiving device, such as without limitation first remote device 116, to display data including at least a visual element and at least a second user-navigable link, which may include any user-navigable link as described above. At least a visual element may include one or more images, one or more elements of text, and/or one or more elements of video content; video content may be streamed using video streaming. At least a data stream may include audio content, such as without limitation audio streaming content; audio content may be included with video content. Any given content of data stream may be displayed or initiated on first remote device 116 automatically, or upon selection of at least a second user-navigable link. Content of data stream may include content describing particular locations, venues, businesses, recreational facilities, or the like associated with website 124 and/or a location to which website is related. For instance, and without limitation, website 124 may include a local directory website for a neighborhood, state, district, municipality, or the like, and content of data stream may relate to information concerning particular locations, venues, businesses, recreational facilities, or the like within the neighborhood, state, district, municipality, or the like. Data stream may alternatively or additionally be provided to a television or other media device; provision may be effected via any form of transmission, including transmission via website, transmission over cable, fiberoptic, and/or satellite networks, and/or transmission via electromagnetic radiation to an antenna.

Continuing to refer to FIG. 1, first server 104 may be designed and configured to perform any method step or steps as described in further detail below. For instance, and without limitation, first server 104 may be designed and configured to extract, from a communication received from a first remote device, an identifier of the first remote device and at least a portion of the website 124, generate at least a first location descriptor using the at least a portion of the website, retrieve at least a data stream 148 using the at least a first location descriptor, and to remotely generate a hybrid website 124 combining the at least a modified second display generation element 160 with the at least a first display generation element 128 on first remote device 116, where generating the hybrid website 124 includes creating at least a modified second display generation element 160, the at least a modified second display generation element 160 configuring first remote device 116 to display at least a second user navigable display 164 combining the at least a first user-navigable display 136 with at least a data stream 148 received from the first server 104, and, as described in further detail below.

Figure 2:
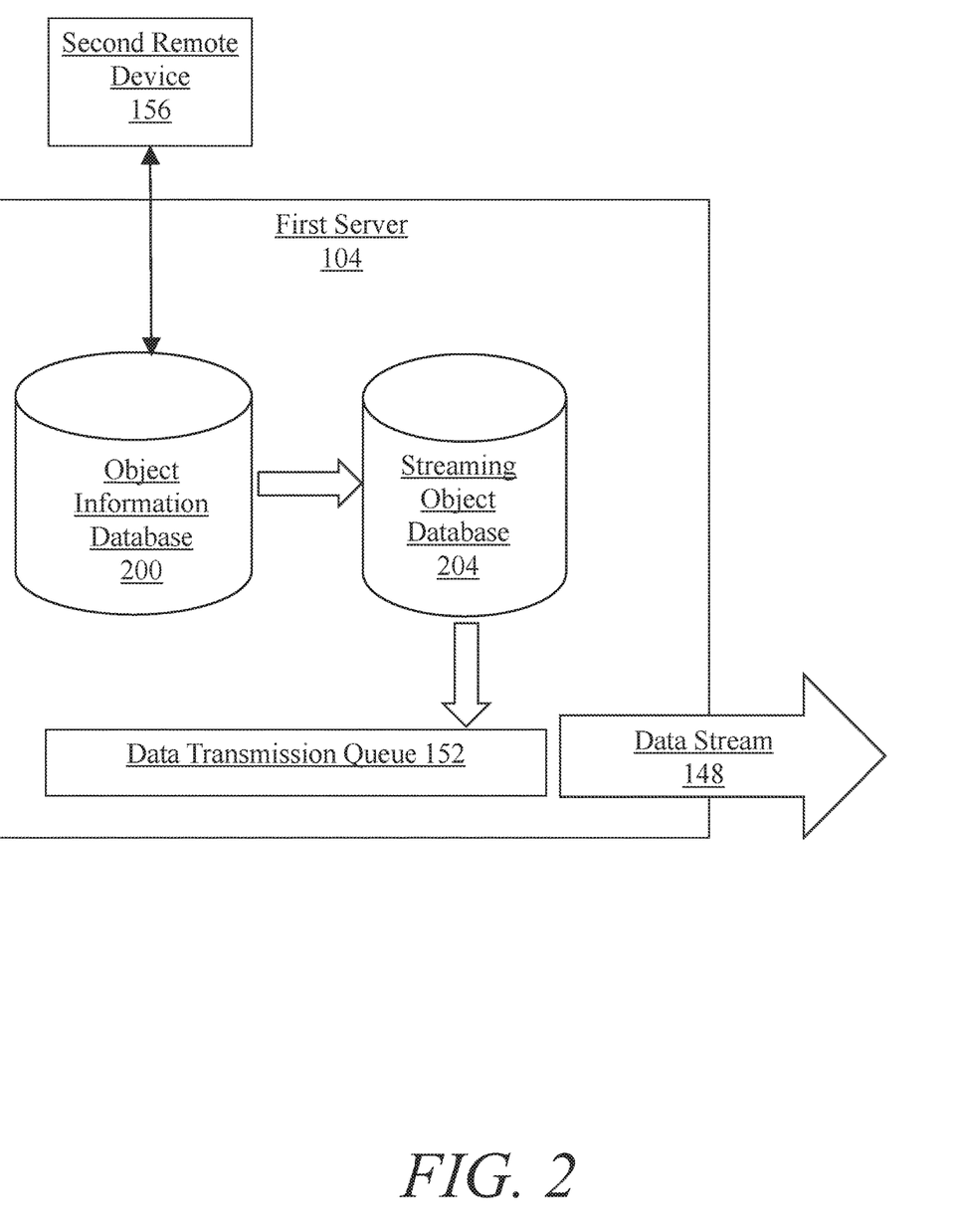
FIG. 2 is a block diagram illustrating an exemplary embodiment of a first server.

Referring now to FIG. 2, an exemplary embodiment of first server 104 is illustrated. First server 104 may include one or more databases for storing data used to generate at least a data stream 148. Each of one or more databases may be implemented in any suitable form, including as relational databases, key-value databases such as without limitation NoSql databases, or any other data structure or data store usable for storage and retrieval of data. One or more databases may include an object information database 200. Object information database 200 may store data received from remote devices, such as without limitation at least a second remote device 156, describing one or more locations; object information database 200 may store data describing second server 108, including without limitation settings, preferences, or the like. Object information database 200 may include user information, including settings selected and/or information received from first remote device 116 and/or at least a second remote device 156, or users thereof. Object information database 200 may store information in key-value form; as a non-limiting example, object information database 200 may be implemented as a NoSql database. Data may be stored in object information database 200 in any suitable structure or unstructured form; for instance, data may be stored in JSON objects to be retrieved by keys corresponding to the location, second server 108, or remote device to which data corresponds. Data in object information database 200 may be updated upon reception of any relevant data; for instance, where data is received corresponding to a particular location, data in object information database 200 regarding the particular location may be retrieved, compared to new data, and modified, removed, or augmented to reflect new data. As a non-limiting example, data may be modified, remoted, or augmented by performing one or more changes to a JSON object containing the data.

Still referring to FIG. 2, one or more databases may include a streaming object database 204. Streaming object database 204 may be a database storing one or more objects containing data used in generating at least a data stream 148. Each of one or more objects, for instance, may be updated, modified, or otherwise changed upon reception of data to be used in at least a data stream 148, for instance as described below in relation to FIG. 3. Streaming object database 204 may also store data used to select at least a data stream 148, including without limitation at least a location description as described in further detail below and/or additional filtering data received from first remote device 116. Streaming object database 204 may be implemented, as a non-limiting example, using a relational database architecture, such as PostgresSQL. Additional databases or data storage objects may be used to store additional objects or datasets, such as image or video data. Although object information database 200 and streaming object database 204 have been presented as exemplary databases for implementing data storage on first server 104, persons skilled in the art, upon reviewing the entirety of this disclosure, will be aware of various alternative or additional databases that may be implemented consistently with this description.

Figure 3:
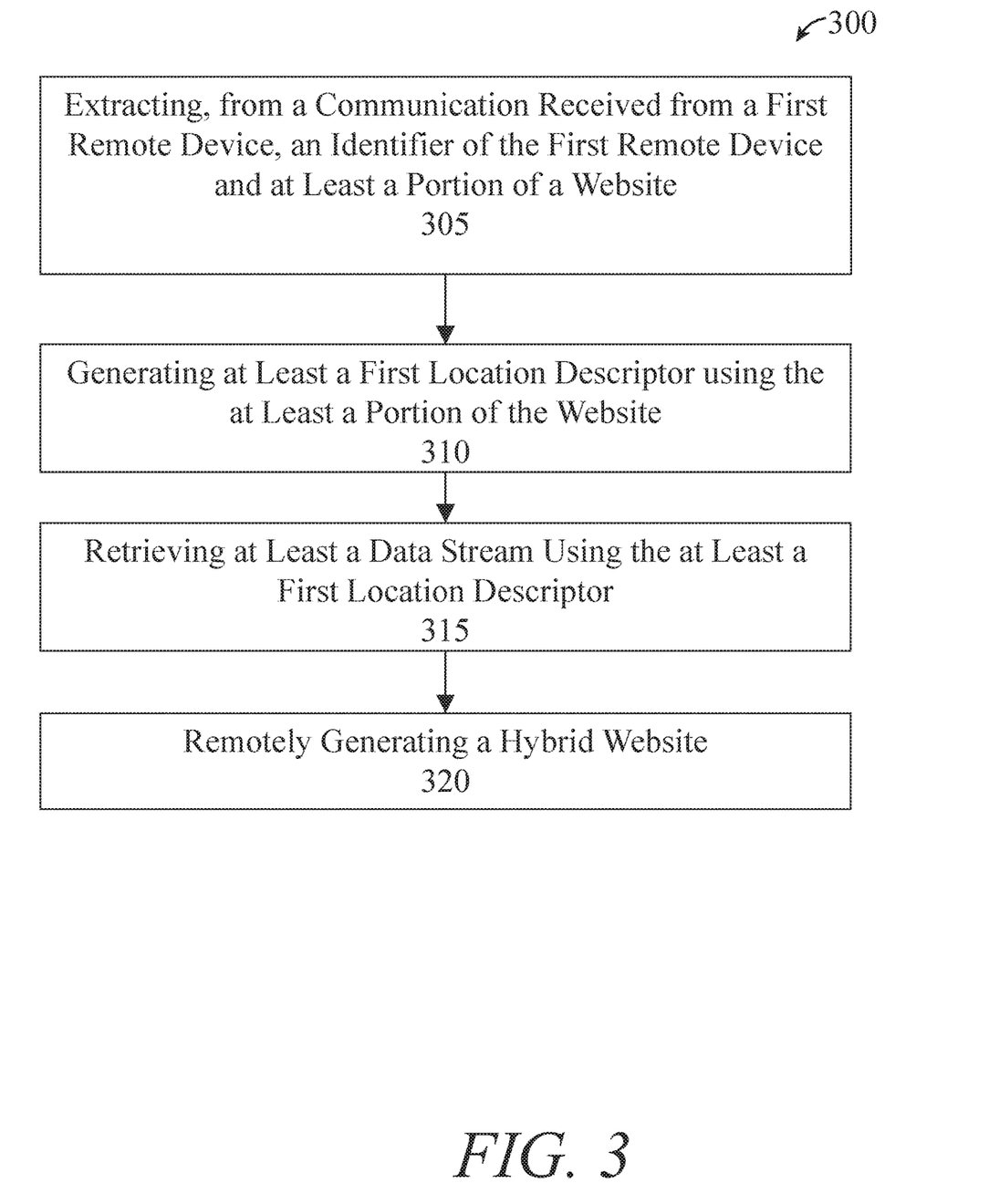
FIG. 3 illustrates particular implementations of various steps of a method of automated multi-source website hybridization.

Referring now to FIG. 3, an exemplary embodiment of a method 300 of automated multi-source website 124 hybridization using streaming data is illustrated. At step 305, first server extracts, from a communication received from first remote device 116, an identifier of the first remote device and at least a portion of a website 124. Communication may be received from first remote device 116 over network 112 according to any suitable electronic communication protocol, including without limitation packet-based communication. In an embodiment, first remote device 116 may parse website 124 and extract or detect reference link 114; first remote device 116 may, for instance, be configured using one or more client-side programs of website 124 to locate reference link 144. Reference link 144 and/or other data provided with website 124 may provide first remote device 116 with a network locator datum, as defined above, identifying first server 104; programming and/or data included in website 124 may direct first remote device 116 to transmit communication to first server. Communication includes an identifier of first remote device 116. Identifier of first remote device 116 may include any data that first server 104 may use to locate first remote device 116 in network 112 and/or send communication or data streams to first remote device 116. Identifier of first remote device 116 may include, at least a network locator datum, which may include any datum indicating a network location of the first remote device 116; at least a network locator datum may include, without limitation, a URL or other representation of an internet protocol (IP) address. In an embodiment, identifier of first remote device 116 may be received as part of communication protocol used to receive communication, including a "source port" or other return address datum included in such communications.

Still viewing FIG. 3, at least a portion of website 124 may include any datum or data that first remote device 116 receives from or with website 124, at least a locator datum, the at least a locator datum indicating a network location of second server 108; at least a network locator datum may include, without limitation, a URL. At least a portion of website 124 may include a token or other datum identifying website 124, at least a reference link 144, or any other datum that first server 104 may use to associate communication with website 124 and/or second server 108. Website 124 may include any website as described above. First server 104 may obtain further information describing or relating to website from second server 108. For instance, and without limitation, first server 104 may query second server 108 by receiving, at the first server 104, at least a network locator datum, the at least a network locator datum indicating a network 112 location of the second server 108; First server 104 may receive at least a network locator datum from second server 108, from a remote device such as first remote device 116 and/or at least a second remote device 156; first server 104 may receive at least a network locator datum from a locally connected device or memory store, a user instruction, or the like. In an embodiment, querying second server 108 includes generating a first communication data packet requesting data from the second server 108 and transmitting the first communication data packet to the network 112 location as a function of the at least a network locator datum; first communication data packet may include, without limitation, a request packet used to initiate an HTTP session. As a result of querying, first server 104 may receive from second server 108 any datum relating to second server 108 and/or website, including without limitation output of at least a first display generation element 128 and/or at least a second display generation element 128, which may be transmitted according to any suitable transmission protocol as described above.

At step 310, and still referring to FIG. 3, first server generates at least a first location descriptor using the at least a portion of the website. At least a first location descriptor may be received from second server 108; for instance, at least a first location descriptor may be included in website 124, and returned in response to a query, such as query as described above in reference to step 305. At least a first location descriptor may be transmitted from second server 108 to first server 104 separately, or prior to first server 104 querying website 124. Thus, for instance, website 124 and/or an administrator of website 124 may specify one or more "geofences" establishing a geographical area within which subjects of at least a data stream 148 should be located, so that first server 104 selects at least a data stream 148 of plurality of data streams with at least a location-specific datum pertaining to a location as established by geofences. Alternatively or additionally, website 124 and/or an administrator of website 124 may specify a list of one or more venues with regard to which data streams are desired, and at least a data stream 148 having at least a location-specific datum matching list of venues may be selected. At least a first location descriptor may be included in at least a portion of website 124 received from first remote device 116; for instance, website 124 may include at least a first location descriptor in at least a first display generation element, at least a second display generation element, or the like. At least a first server may retrieve the at least a first location descriptor from a data structure relating location descriptors to portions of websites, as a function of at least a portion of website 124; data structure may include, without limitation, object information database 200, streaming object database 204, or an additional data structure.

Still referring to FIG. 3, at least a first location descriptor may be a datum describing a location for which data streams are desired; at least a first location descriptor may include, as a non-limiting example, one or more location-specific data. At least a first location descriptor may include a list of location-specific data, such as without limitation a list of venues. At least a first location descriptor may include a radius about a location defined by a location-specific datum; for instance, a geographical area contained within a radius about a set of GPS coordinates, which may be geographical coordinates of a user. In an embodiment, identifying at least a matching data stream may include determining that a location-specific datum of at least a matching data stream identifies a location geographically within at least a first location descriptor. As a non-limiting example, location may be geographically within at least a first location descriptor if, for instance, at least a first location descriptor describes a local polity, and location is within the local polity, such as a street address and/or zip code located within a municipality or neighborhood defined by at least a first location descriptor, or closer than a defined radius to a chosen geographical point such as GPS coordinates. As a further non-limiting example, where at least a first location descriptor includes a list of location-specific data, location-specific datum may match at least a first location descriptor where location-specific datum is on the list. At least a first location descriptor may include sub-locations, representing smaller locations geographically within a location described by at least a first location descriptor; examples may include without limitation a smaller radius around GPS coordinates located within the first location, a smaller polity within a polity described by at least a first location descriptor, such as a neighborhood, district, or the like, and/or a block, street, public square, a particular venue within the first location, or any other location that may be described by a location descriptor as described above and located geographically within a location described by at least a first location descriptor. At least a location descriptor may alternatively or additionally include an identity of second server 108, to which one or more data streams having location-specific data may be linked in a data structure such as without limitation object information database 200 and/or streaming object database 204.

At step 315, and still viewing FIG. 3, first server 104 retrieves at least a data stream using the at least a first location descriptor. As noted in further detail below, first server 104 may generate at least a data stream, and/or receive at least a data stream from an additional device. First server 104 may generate and/or receive a plurality of data streams. Retrieving at least a data stream may include selecting the at least a data stream from a plurality of data streams and retrieving the at least a data stream as a function of the selection. As a non-limiting example, each data stream of the at least a data stream may include a location-specific datum. A location-specific datum, as used herein, may be any datum linking a data stream of plurality of data streams to a particular geographic location; particular geographic location may include, without limitation, coordinates indicating a point in a geographic coordinate system such as latitude and longitude. Location-specific datum may include a local polity, which as used herein is a geographical area defined by a controlling governmental entity, such as a municipality, town, township, borough, neighborhood, or the like. Location-specific datum may include a datum of postal address information, including without limitation a street number, street name, block, square, city or town, state, or postal code used in a postal address. Location-specific datum may include an identity of one or more venues, where "venues" are defined herein as named locations or locations operated by entities, including community centers, parks, businesses such as restaurants, cafes, or stores, governmental buildings such as courts, police stations, fire stations, or town or city halls, and/or religiously oriented buildings or facilities. Persons skilled in the art, upon reviewing the entirety of this disclosure, will be aware of various additional examples of location-specific datum consistent with the above description.

In an embodiment, at least a data stream may be linked to at least a first location descriptor in a data structure such as without limitation object information database 200 and/or streaming object database 204. Alternatively or additionally where first server 104 receives at least a reference link 144, first server 104 may compare at least a reference link 144 to one or more stored values; one or more stored values may be stored, as a non-limiting example, in steaming object database 204. In an embodiment, first server 104 may receive a stream retrieval key. Stream retrieval key may indicate which data streams are to be transmitted to second server 108; stream retrieval key may do this indirectly by identifying second server 108, permitting first server 104 to look up data concerning second server 108. In an embodiment, first server 104 detects the at least a reference link 144 by matching stream retrieval key to the at least a reference link 144; for instance, first server 104 may determine a stream retrieval key stored in a database entry, for instance in streaming object database 204, linking at least a network locator datum as described above to stream retrieval key, and compare at least a stream retrieval key to reference link 144 and/or search for at least a reference link 144 matching stream retrieval key. Stream retrieval key may alternatively or additionally be used to look up data usable to search for at least a reference link 144.

Still referring to FIG. 3, identifying at least a matching data stream of the plurality of data streams having location-specific datum matching the at least a first location descriptor, and selecting the at least a data stream 148 from the at least a matching data stream. First server 104 may alternatively or additionally select at least a data stream 148 from plurality of data streams using additional criteria received from first remote device 116. For instance, first server 104 may receive, from first remote device 116, a non-geographic category datum. Non-geographic category datum may include, without limitation, a category of venue; categories may include, as a non-limiting example, parks, recreation facilities, restaurants, retail establishments, service providers, government buildings, emergency first responders, transportation facilities or companies, or the like. In an embodiment, first server 104 may select at least a data stream 148 using both at least a first location descriptor and non-geometric category datum; for instance, first server 104 may provide an intersection of location descriptor and non-geometric category data, such as a list of all restaurants within one or more geofences established as described above.

At step 320, and continuing to refer to FIG. 3, first server 104 remotely generates a hybrid website 124 on the second server 108. Remotely generating hybrid website 124 includes creating at least a modified second display generation element 160, the at least a modified second display generation element 160 configuring first remote device 116 to display a second user navigable display 164 combining the at least a first user-navigable display 136 with a second user navigable display 164 comprising at least a data stream 148 received from the first server 104. First server 104 may, as a non-limiting example, create modified second display generation element 160 by inserting in the at least a second display element a streaming display instruction, the streaming display instruction configuring the remote device to display the at least a second user navigable display 164. Streaming display instruction may include one or more client-side instructions, including without limitation JSON instructions or objects as described above. Streaming display instructions may be combined with one or more elements of data from data stream; for instance, one or more elements of data may be combined with elements of second display generation element at second server 108 and transmitted from second server 108 to remote device. Alternatively or additionally, one or more instructions to receive elements of data from data stream may include instructions for remote device to receive elements of data from first server 104 rather than second server 108.

With continued reference to FIG. 3, first server 104 may remotely combine modified at least a second display generation element with at least a first display generation element to form hybrid website. Hybrid website as a result may configure first remote device 116 to display elements of first user-navigable display 136 as configured by at least a first display generation element along with display elements received from at least a data stream 148; the result may be a website that maintains overall appearance and content of website 124, while incorporating the regularly updating and dynamic content from at least a data stream 148. First server 104 may identify at least a second display generation element 128. In an embodiment, identifying at least a second display generation element 128 may include detecting a file descriptor indicating a location at second server 108 of a file containing the at least a second display generation element 128. File descriptor may include, as a non-limiting example, a file name of an HTML, JSP, PHP, or similar file, and/or a directory where such a file may be located; file descriptor may be combined with or include location datum as described above. In an embodiment, identifying may include identifying a name or label indicating a client-side program and/or set of instructions for generating all or a portion of a view of user-navigable display, including without limitation a frame, "navigation bar," table, or the like.

Continuing to refer to FIG. 3, first server 104 may generate at least a data stream 148. In an embodiment, first server 104 generates at least a data stream 148 by receiving, from at least a second remote device 156, data describing a location, and generating data stream as a function of the data describing the location. At least a second remote device 156 may include a remote device located at the location; remote device located at the location may have a current location determined, as described above, to be at the location, or may be a device associated with or owned by a venue at the location. A combination of such second remote devices may transmit data describing location; as a non-limiting example, data describing the location may include news and facts about a venue received from a device associated with the venue and additional information provided by a device of, for instance, a visitor to or customer of the venue.

In an embodiment, and still viewing FIG. 3, first server 104 may collect data describing the location; for instance, data may be stored in object information database 200 as described above. First server 104 may divide data describing the location into quanta to be transmitted; quanta may include, as a non-limiting example, packets for transmission over network 112. First server 104 may determine whether data describing the location has been received previously or is new; for instance, first server 104 may retrieve data previously received regarding location and compare such data to currently received data. First server 104 may determine that one or more elements of stored data describing location are out of date; for instance, data describing location may be sent with an expiration date and/or time, or may have a default expiration date or time, which first server 104 may treat as a flag indicating to ignore or delete data. As a non-limiting example, data describing an upcoming event may "expire," to be deleted or ignored, after a date and/or time at which the event is scheduled to occur. Modifications of data to be streamed may be performed, in a non-limiting example, by modifying streaming objects stored in streaming object database 204. In an embodiment, first server 104 may convert only new data into quanta to place on at least a data transmission queue 152; for instance, first server 104 may be set to "stream on new," and add newly received data to data stream. First server 104 may regulate stream rate of at least a data stream 148; stream rate may be modified, as a non-limiting example, based upon a setting received from second server 108 and/or a setting received from first remote device 116. Stream rate may be performed constantly on new. Stream rate may be periodic; for instance, all current data may be quantized, placed on at least a data transmission queue 152, and sent out every few seconds. Periodic streaming may also be limited to novel data, for instance using the "created_at" attribute, or a similar element, to determine a timestamp of creation of the data.

With continued reference to FIG. 3, first server may receive a second location descriptor from first remote device 116. In an embodiment, second location descriptor received from first remote device 116 may include a location descriptor generated by a navigation facility 120; for instance, navigation facility 120 of first remote device 116 may detect a current location of remote device and provide the current location as second location descriptor to first server 104. A user of first remote device 116 may alternatively or additionally enter an instruction containing second location descriptor. Current location of user device may further be determined, without limitation, using IP address geolocation, signal strength from a transceiver such as a cell tower, wi-fi terminal, or the like having a known location, inertial measurement unit data indicating an approximate path of travel by user device from a previously known location, magnetic readings of location and/or orientation relative to the Earth's magnetic field, inertial measurement unit or other determinations of current user orientation, or the like. Current location of user device may be represented, without limitation, as an average and/or weighted average of any or all of the above measures of current location. Current location may alternatively or additionally be represented as a vector of location measurement values. A "vector," as defined in this disclosure, is n n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same, as measured for instance using cosine similarity; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Still referring to FIG. 3, determination that second location is at or within first location may be performed in a variety of ways. A radius from current location of use device, which may be configured on remote device by user, may be specified. Similarly, a venue at which remote device is located, as indicated for instance by a user entry or by matching current location to a recorded location of a venue may also be performed. Any measure of current location, vector of measures of current location, and/or average or other aggregate datum of current location as provided above may be compared to a corresponding measure, vector, average, and/or aggregate of measures describing first location; for instance and without limitation, where any measure of distance and/or vector similarity falls within or below a threshold number representing a proximity that indicates presence at first location, system 100 or any component thereof may identify current and/or second location as located at first location, and/or any such measure of proximity may be compared to measures of proximity to additional locations, and first location may be determined by such comparison to be a most proximate location. Alternatively or additionally, a measure of current location, vector of measures of current location, and/or average or other aggregate datum of current location as provided above may be compared to a corresponding measure, vector, average, and/or aggregate of measures describing devices and/or users previously determined to have been located at first location; similar threshold comparisons and/or comparisons to measures of proximity to other locations to those described above may be employed. measure, vector, average, and/or aggregate of measures describing devices and/or users previously determined to have been located at first location may be determined, without limitation, by collecting current locations of users, determining that such users are at first location by virtue of redemption of offers, postings indicating presence thereat, and/or user entries indicating presence thereat, which may, e.g., be prompted by system 100 and/or any component thereof on display of user device (e.g., by asking user if they are at first location). A representative measure, vector, average, and/or aggregate of measures describing a device and/or user previously determined to have been located at first location may be used for the above-described threshold comparisons; alternatively or additionally, an aggregate measure, vector, average, and/or aggregate of measures describing devices and/or users previously determined to have been located at first location may be performed by, e.g., calculating a running average of one or more such measures, vectors (e.g. by calculating component-wise averages), averages, and/or aggregates of measures describing devices and/or users previously determined to have been located at first location, and comparing a measure, vector, average, and/or aggregate of measures describing current location to such a computed representative vector.

Alternatively or additionally, data describing users and/or user devices known to have been at various locations including first location, with concomitant measures of proximity to such locations, may be used as training data to generate a classifier that receives inputs describing measures of proximity and generates outputs indicating a location at which a device is located. A "classifier" as used in this disclosure is a model for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Classifier may be produced and/or refined iteratively as additional data As a non-limiting example, and still referring to FIG. 3, classifier may be produced using a Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. System 100 and/or components thereof may then calculate a likelihood table by calculating probabilities of different data entries and classification labels. System 100 and/or components thereof may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, System 100 and/or components thereof may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. K-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like, for instance as described above. Persons skilled in the art, upon reviewing the entirety of this disclosure, will be aware of various alternative or additional methods that may be used to determine a most probable location of a user device relative to first location and/or additional locations. Classifier may classify to labels representing locations; thus, where an input of current location data is provided, classifier may output first location, indicating that current location is at or within first location.

Still referring to FIG. 3, first server 104 may modify at least a data stream 148 as a function of second location descriptor; modification may include replacing at least a first data stream of at least a data stream with at least a second data stream, which may be selected from plurality of data streams. Modification may include adding at least a second data stream to at least a data stream. Modification may include removing at least a first data stream from at least a data stream. For instance, where first remote device 116 has arrived at a first sub-location within a location represented by first locator datum, modification may include removing all data streams except those relating to the first sub-location; movement to a second sub-location may induce modification of at least a data stream to replace at least a first data stream linked to the first sub-location with at least a second at a stream linked to the second sub-location. Modification of at least a data stream may include determining that user is at or near to a venue and providing a data stream relating to the venue. Modification may include detecting venues or locations within a particular radius of user location, which may be a default radius, or a radius specified by user and/or first remote device 116. Modification may include determining that current location is within one or more local polities and providing data streams also located within the one or more polities. In a further non-limiting example, first server 104 may provide at least a data stream 148 matching an intersection of at least a first location descriptor and second location descriptor. For instance, and without limitation, first location descriptor may specify a city and second location descriptor may specify a radius about current location of first remote device 116; first server 104 may select data streams having location-specific data for locations both within the city and closer than the radius to the current location. Persons skilled in the art will be aware, upon reviewing the entirety of this disclosure, of a multiplicity of combinations of second location descriptor received from first remote device 116 and second location descriptor received from second server 108. In an embodiment, where current location is outside a geographic area provided by second server 108, such as a maximal geographic area, first server 104 may ignore current location for selection of at least a data stream 148; for example, if all locations provided by second server 108 are within borders of a particular city, or if the second server 108 has specified that only data streams corresponding to location-specific data within those borders are to be selected, and if current location is outside the borders, all data streams having location-specific data located within the borders may be selected. Modification may alternatively or additionally include determining that the second location descriptor is inside and/or geographically within the at least a first location descriptor and modifying the at least a data stream as a function of the determination.

Still viewing FIG. 3, user may enter data at or via modified website 124 and/or at least a data stream, and first server 104 may modify at least a data stream in response. For instance, and without limitation, where at least a data stream includes a second user navigation link, first server 104 may receive a user selection of the second user-navigation link and modify at least a data stream as a function of the user selection. User selection of second user-navigation link may include a selection of a visual element depicting or otherwise associated with a sub-location, such as particular facility, neighborhood, venue, business, or the like. For instance, a user may see a display in at least a data stream indicating a restaurant and may select that display; this may cause at least a data stream to show only information related to the selected restaurant. Second user-navigable link may be configured to select a category of sub-locations, such as parks, restaurants, recreation facilities, city government buildings, or the like; selection may cause at least a data stream to restrict display to only a selected category or categories. Alternatively or additionally, user may enter a search query in a text box or other text entry facility of modified website 124 and/or at least a data stream; at least a data stream may be modified to reflect results of search query, which may be compared to web search results and/or submitted to object information database 200 and/or streaming object database 204. Persons skilled in the art, upon reviewing the entirety of this disclosure, will be aware of various way in which one or more user entries may be submitted at modified website 124 and/or used to modify at least a data stream.

In an embodiment, above-described systems and methods may convert out-of-date websites into active and continuously updating web sites that harness active streaming platform content while retaining the overall appearance and administrative control of the original website. As a result, a hybrid website so created transforms from a website that local administrators must update with considerable difficulty into a website that updates its own time-sensitive content, while remaining otherwise unaffected by the change.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
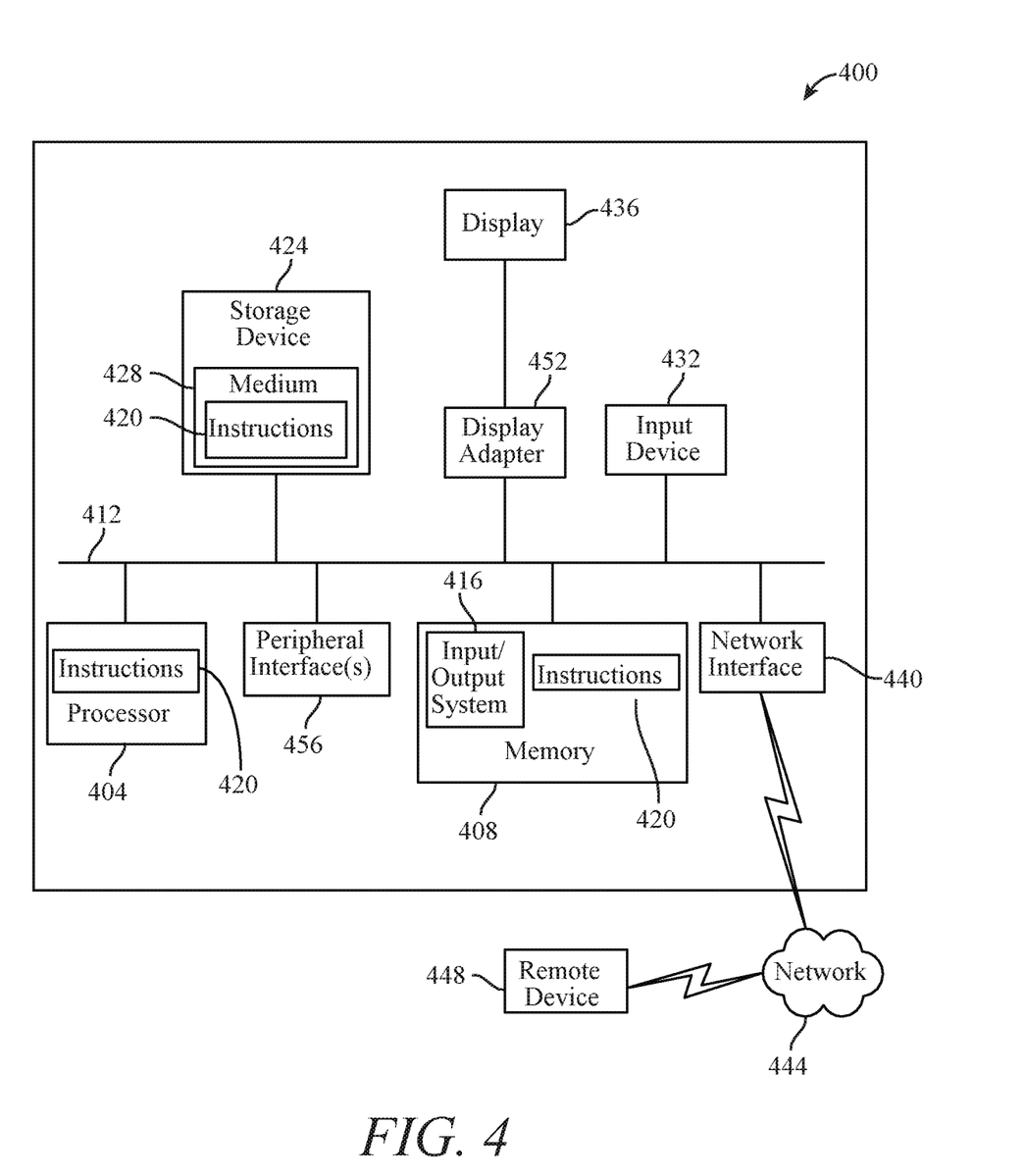
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIRE- WIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of automated multi-source website hybridization using streaming data, the method comprising:
   extracting, by a first server connected to a network, from a communication received from a first remote device, an identifier of the first remote device and at least a portion of a website comprising at least a first geographical location description, comprising a sub-location of the first geographical location, associated with a geographical area, the website located at a second server connected to the network, wherein the website further comprises:
   at least a first display generation element and at least a second display generation element, each of the at least a first display generation element and the at least a second display generation element configuring the first remote device to provide to a user at least a first user-navigable display received from the second server, the at least a first user-navigable display combining at least a visual element and at least a user-selectable navigation link; and
   at least a reference link incorporated in the at least a second display generation element the at least a reference link identifying a network locator datum of the first server and a display location at the at least a second display generation element;
   generating, by the first server, at least a first physical location descriptor associated with the geographical area, using the at least a portion of the website;
   retrieving, by the first server, at least a data stream using the at least a first physical location descriptor and the sub-location of the first geographical area; and
   remotely generating, by the first server, a hybrid website on the first remote device, the hybrid website combining the at least a first display generation element with at least a modified second display generation element wherein generating the hybrid website comprises:
   creating the at least a modified second display generation element, the at least a modified second display generation element configuring the first remote device to display a second user-navigable display combining the at least a first user-navigable display with the at least a data stream at the display location of the at least a reference link;
   receiving, from the first remote device, a second physical location descriptor;
   determining that the second physical location descriptor is at a sub-location of the at least a first physical location descriptor; and
   modifying the at least a data stream as a function of the second physical location descriptor.

2. The method of claim 1, wherein extracting the identifier of the first remote device further comprises extracting at least a network locator datum, the at least a network locator datum indicating a network location of the first remote device.

3. The method of claim 1, wherein extracting the at least a portion of the website further comprises extracting at least a network locator datum, the at least a network locator datum indicating a network location of the second server.

4. The method of claim 3, wherein generating the at least a first physical location descriptor further comprises:
   querying the second server using the at least a network locator datum; and
   receiving the at least a first physical location descriptor from the second server.

5. The method of claim 1, wherein generating the at least a first physical location descriptor further comprises retrieving, from a data structure relating location descriptors to portions of websites, the at least a first physical location descriptor as a function of the at least a portion of the website.

6. The method of claim 1, wherein the at least a first physical location descriptor includes a local polity.

7. The method of claim 1, wherein the at least a first physical location descriptor includes an area defined by a radius about a specific physical location.

8. The method of claim 1, wherein the at least a first physical location descriptor further comprises a list of physical locations.

9. The method of claim 1, wherein the first server generates a plurality of data streams, and retrieving the at least a data stream further comprises:
   selecting the at least a data stream from the plurality of data streams: and
   retrieving the at least a data stream as a function of the selection.

10. The method of claim 9, wherein:
    each data stream of the plurality of data streams further includes a physical location-specific datum; and
    selecting the at least a data stream from the plurality of data streams further comprises:
       identifying at least a matching data stream of the plurality of data streams having a physical location-specific datum matching the at least a first physical location descriptor; and
       selecting the at least a data stream from the at least a matching data stream.

11. The method of claim 1, wherein creating the modified second display generation element further comprises inserting in the at least a second display element a streaming display instruction, the streaming display instruction configuring the first remote device to display the at least a second user-navigable display.

12. The method of claim 1 further comprising generating the at least a data stream.

13. The method of claim 12, wherein generating the at least a data stream further comprises:
    receiving, from at least a second remote device at a physical location matching the at least a first physical location descriptor, data describing the location; and
    generating, as a function of the data describing the physical location, the at least a data stream.

14. The method of claim 1, wherein modifying the at least a data stream further comprises:
    determining that the second physical location descriptor is inside the at least a first physical location descriptor; and
    modifying the at least a data stream as a function of the determination.

15. The method of claim 1, wherein modifying the at least a data stream further comprises:
    Determining that the second physical location descriptor is outside the at least a first physical location descriptor; and
    Modifying the at least a data stream as a function of the determination.

16. The method of claim 1, wherein the at least a data stream further includes a second user-navigation link, and further comprising:
    receiving, at the first server, a user selection of the second user-navigation link; and
    modifying, by the first server, the at least a data stream as a function of the user selection.

17. A system for automated multi-source website hybridization using streaming data, the system comprising:
    a first server connected to a first remote device over a network, the first server designed and configured to:
       extract, from a communication received from a first remote device, an identifier of the first remote device and at least a portion of a website, comprising at least a first geographical location description, comprising a sub-location of the first geographical location, associated with a geographical area, the website located at a second server connected to the network, wherein the website further comprises:
          at least a first display generation element and at least a second display generation element, each of the at least a first display generation element and the at least a second display generation element configuring the first remote device to provide to a user at least a first user-navigable display received from the second server, the at least a first user-navigable display combining at least a visual element and at least a user-selectable navigation link; and
          at least a reference link incorporated in the at least a second display generation element the at least a reference link identifying a network locator datum of the first server and a display location at the at least a second display generation element;
       generate at least a first physical location descriptor associated with the geographical area, using the at least a portion of the website;
       retrieve at least a data stream using the at least a first physical location descriptor and the sub-location of the first geographical location; and
       remotely generate a hybrid website on the first remote device, the hybrid website combining the at least a first display generation element with at least a modified second display generation element wherein generating the hybrid website comprises:
          creating the at least a modified second display generation element, the at least a modified second display generation element configuring the first remote device to display a second user-navigable display combining the at least a first user-navigable display with the at least a data stream at the display location of the at least a reference link
       receive, from the first remote device, a second physical location descriptor;
       determine that the second physical location descriptor is at a sub-location of the at least a first physical location descriptor; and
       modify the at least a data stream as a function of the second physical location descriptor.

18. The method of claim 1, wherein the data stream comprises content associated with the website and the geographical area.

* * * * *